(12) United States Patent
Hirano

(10) Patent No.: US 6,695,376 B1
(45) Date of Patent: Feb. 24, 2004

(54) DISPLAY APPARATUS

(75) Inventor: Yoshihiro Hirano, Tokyo (JP)

(73) Assignee: Pioneer Corporation, Tokyo (JP)

( * ) Notice: Subject to any disclaimer, the term of this patent is extended or adjusted under 35 U.S.C. 154(b) by 116 days.

(21) Appl. No.: 09/721,626

(22) Filed: Nov. 27, 2000

(30) Foreign Application Priority Data

Nov. 25, 1999  (JP) .......................................... 11-333806

(51) Int. Cl.[7] ................................................. H04N 5/64
(52) U.S. Cl. ..................................... 296/37.7; 248/921
(58) Field of Search ................ 296/37.7; 248/921–923; 348/837; 353/13

(56) References Cited

U.S. PATENT DOCUMENTS

| | | | |
|---|---|---|---|
| 4,836,486 A | * | 6/1989 | Vossoughi et al. |
| 5,924,665 A | * | 7/1999 | Sweere et al. |
| 6,186,459 B1 | * | 2/2001 | Ma |
| 2002/0066843 A1 | * | 6/2002 | Oddsen, Jr. et al. |

* cited by examiner

*Primary Examiner*—Dennis H. Pedder
(74) *Attorney, Agent, or Firm*—Sughrue Mion, PLLC

(57) ABSTRACT

There is provided a display apparatus which can avoid different visibility according to positions of seats in an automobile and which can supply information to passengers seated on all the seats. The display apparatus 1 comprises a rotary portion 5 adapted to be mounted on a ceiling wall of the automobile, an arm portion 6, and a display unit 7. The rotary portion 5 has a base part 5a which is rotatable around a rotation axis 5b intersecting the ceiling wall 3. The arm portion 6 is supported by means of the rotary portion 5 so as to rotate around a rotation axis 10a. The display unit 7 is supported by means of the arm portion 6 so as to rotate around rotation axes 12a, 13a.

37 Claims, 4 Drawing Sheets

DISPLAY APPARATUS

BACKGROUND OF THE INVENTION

1. Field of the Invention

The present invention relates to a display apparatus to be mounted on a moving body such as an automobile.

2. Description of the Related Art

Heretofore, a display unit such as a television set provided with a liquid crystal display panel is often accommodated in a vehicle as the moving body. This display unit displays information such as images received by the television set.

As an example of the display apparatus provided with the above described display unit 101, there has been proposed a display apparatus 102 attached to a ceiling 103 of an automobile as the moving body, as shown in FIG. 8. The display apparatus 102 illustrated in FIG. 8 includes the display unit 101 which can display the above mentioned information and adapted to be fitted to the ceiling 103 of a passengers' room of the automobile at a wall face 103a facing with the passengers' room.

The above described display unit 101 includes a display panel 104 which can display the above mentioned information and a casing 105 for containing this display panel 104. The casing 105 is formed in a rectangular shape. The display unit 101 is fitted to the wall face 103a so as to rotate around a rotation axis 106.

The rotation axis 106 is arranged along both the wall face 103a and a side of the casing 105. The rotation axis 106 is arranged on an/upper part of the display unit 101 in a lateral direction of the display unit 101.

According to the above described structure, the display apparatus 102 can provide the passengers with the information by rotating the display unit 101 around the rotation axis 106.

The above mentioned automobile as the moving body accommodates a plurality of seats on which the passengers can be seated. In the above described display apparatus 102, the display unit 101 for displaying the information is provided so as to rotate around only one rotation axis 106, and therefore, visibility of the display panel 104 varies according to positions of the seats.

For this reason, according to the positions of the seats, it has been difficult to visually observe the information displayed on the display panel 104 with reliability. It can be hardly said that the information can be surely supplied to all the passengers seated on a plurality of the seats.

In view of the above described drawback, it is an object of the present invention to provide a display apparatus which can avoid different visibility according to positions of the seats, when the display apparatus is provided in a moving body accommodating a plurality of the seats, and can reliably supply information to passengers seated on all the seats.

SUMMARY OF THE INVENTION

In order to solve the above described problem and attain the object, there is provided a display apparatus, according to a first aspect of the present invention, which comprises a rotary portion rotatably provided on a ceiling of a moving body, an arm portion supported by means of the rotary portion, and a display portion supported by means of the arm portion.

According to a second aspect of the invention, the arm portion is rotatably supported by means of the rotary portion.

According to a third aspect of the invention, the rotary portion is provided so as to rotate around a first rotation axis which extends in a direction intersecting the ceiling, and the arm portion is supported by means of the rotary portion so as to rotate around a second rotation axis which intersects the first rotation axis.

According to a fourth aspect of the invention, the display portion is rotatably supported by means of the arm portion.

According to a fifth aspect of the invention, the display portion is provided on the arm portion so as to rotate around both a third rotation axis and a fourth rotation axis which intersect with each other.

According to a sixth aspect of the invention, the rotary portion is provided so as to rotate around the first rotation axis which extends in a direction intersecting the ceiling, the arm portion is supported by means of the rotary portion so as to rotate around the second rotation axis intersecting the first rotation axis, the third rotation axis is arranged in parallel to the first rotation axis, and the fourth rotation axis is arranged in parallel to the second rotation axis.

According to a seventh aspect of the invention, the display apparatus further comprises a plurality of recesses formed in a concave manner in a wail face of the ceiling of the moving body, the recesses being adapted to contain the arm portion.

According to an eighth aspect of the invention, the recesses are different in directions from one another and formed so as to radially extend from a mounting position of the rotary portion with respect to the ceiling.

According to a ninth aspect of the invention, the display apparatus comprises a second recess provided in at least one of a plurality of the recesses at a position remote from the mounting position of the rotary portion with respect to the ceiling, the second recess being adapted to contain the display portion.

According to the first aspect of the invention, the display portion is supported by means of the rotary portion by way of the arm portion. For this reason, as the rotary portion rotates with respect to the ceiling of the moving body, the display portion extensively moves in the moving body. In case where a plurality of seats are provided in the moving body, the rotary portion is rotated to move the display portion extensively, whereby the display portion can be substantially faced with the seats respectively.

According to the second aspect of the invention, the arm portion is rotatably supported with respect to the rotary portion, and the display portion can extensively move in the moving body more reliably.

According to the third aspect of the invention, the rotary portion is rotatable around the first rotation axis which intersects the ceiling, and the arm portion is rotatable around the second rotation axis which intersects the first rotation axis. Accordingly, the display portion can extensively move in the moving body more reliably.

According to the fourth aspect of the invention, since the display portion is rotatably supported by means of the arm portion, the display portion can extensively move in the moving body more reliably.

According to the fifth aspect of the invention, since the display portion is rotatably supported by means of the arm portion so as to rotate around both the third rotation axis and the fourth rotation axis, the display portion can extensively move in the moving body, and at the same time, the display portion can be more reliably faced with the seats respectively.

According to the sixth aspect of the invention, since the third rotation axis is arranged in parallel to the first rotation axis, the display portion can extensively move in the moving body, and at the same time, the display portion can be more reliably faced with the seats respectively.

Moreover, since the fourth rotation axis is arranged in parallel to the second rotation axis, the display portion can be displaced from a position along the ceiling to a position where the display portion is faced with the passengers seated on the seats.

According to the seventh aspect of the display apparatus of the invention, since the recesses formed in a concave manner in the wall face of the ceiling contain the arm portion, the mounting space can be saved.

According to the eighth aspect of the display apparatus of the invention, since a plurality of the recesses extend in a radial direction from the mounting position of the rotary portion with respect to the ceiling, the respective recesses contain the arm portion saving the mounting space, and in addition, the display portion can extensively move in the moving body more reliably, and at the same time, the display portion can be more reliably faced with the seats respectively.

According to the ninth aspect of the invention, since the second recess can contain the display portion, the second recess will contain the display portion while the display apparatus in not in use, and the mounting space of the display apparatus can be saved.

DESCRIPTION OF THE PREFERRED EMBODIMENTS

Now, an embodiment of the present invention will be described referring to FIGS. 1 to 7.

Figure 1:
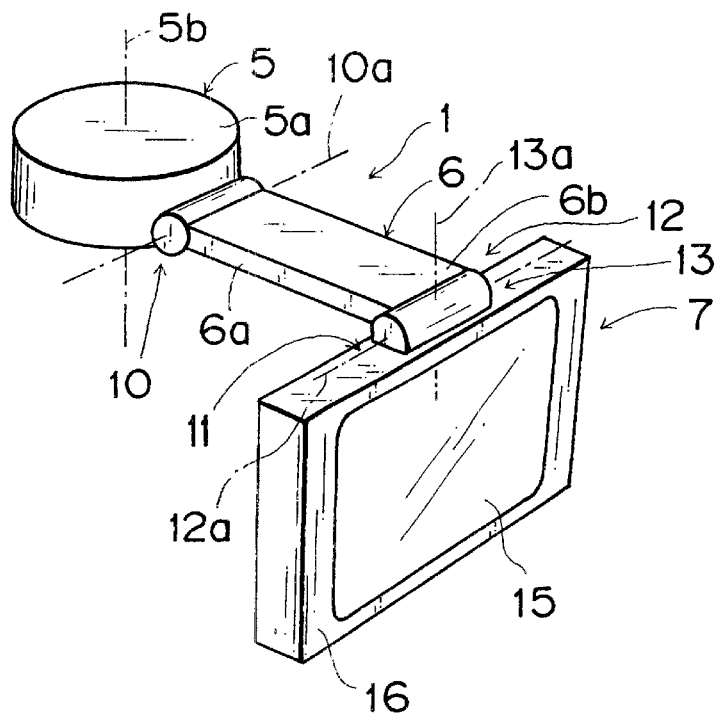
FIG. 1 is a perspective view showing a display apparatus according to one embodiment of the invention.

A display apparatus 1 according to the embodiment of the present invention as shown in FIG. 1 is an apparatus which is mounted on a substantially flat wall 3 of a ceiling (see FIGS. 3 to 7) of a passengers' room in a vehicle 2 (see FIG. 2) such as an automobile as a moving body, and displays images, etc. received by a television set accommodated in the vehicle 2.

Figure 2:
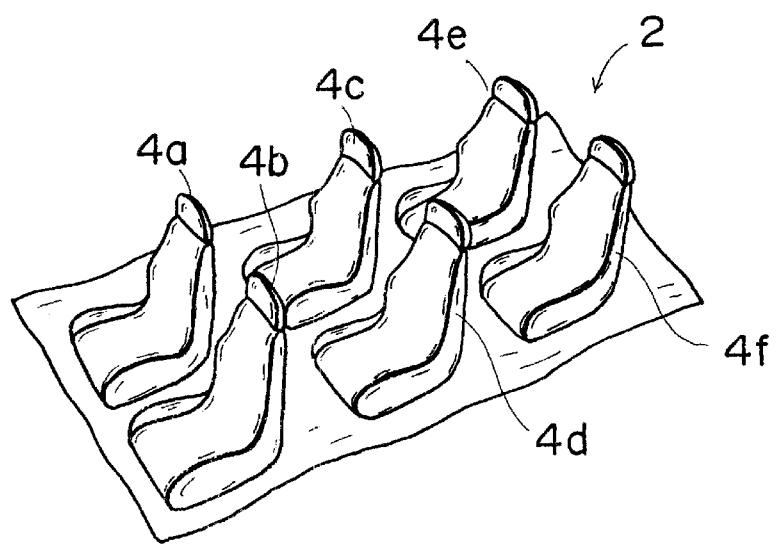
FIG. 2 is a perspective view showing arrangement of seats in a vehicle on which the display apparatus according to the embodiment is mounted.
Figure 3:
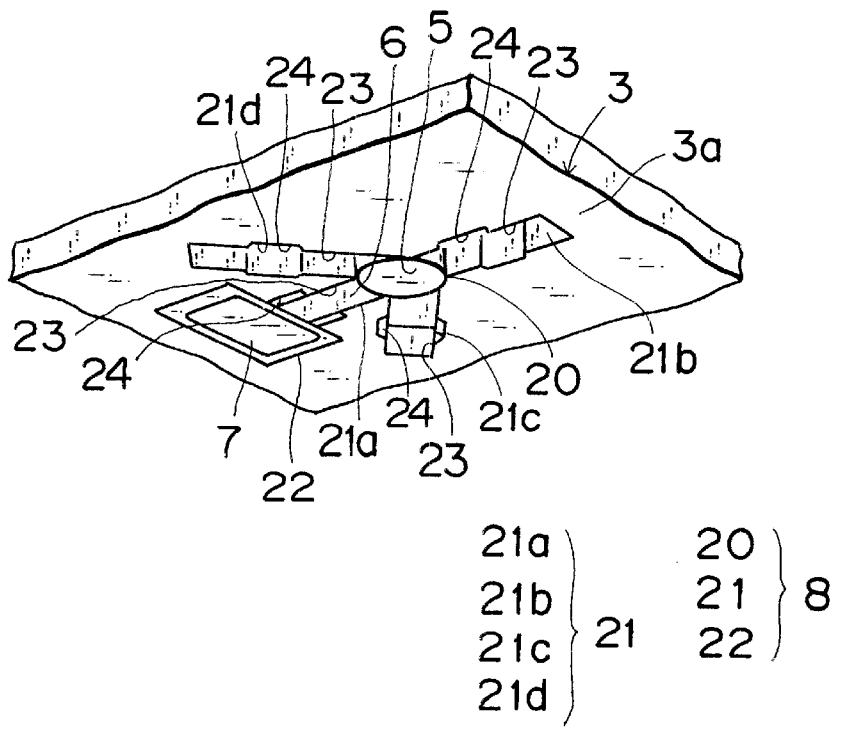
FIG. 3 is a perspective view showing the display apparatus according to the embodiment while it is not in use.
Figure 4:
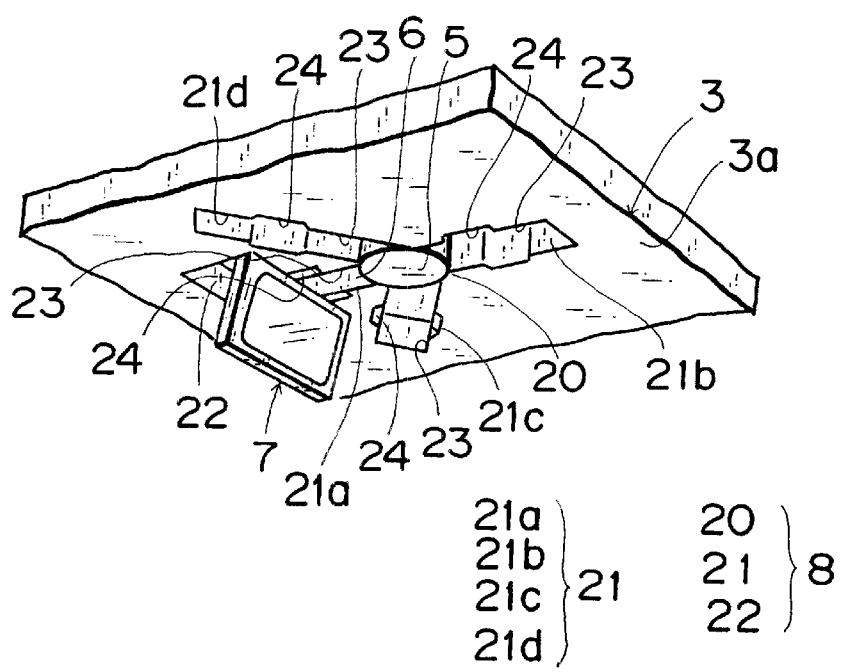
FIG. 4 is a perspective view showing the display apparatus according to the embodiment in a state where information is supplied to passengers seated on a plurality of seats.

The vehicle 2 as the moving body provided with the display apparatus 1 accommodates a plurality of seats 4a, 4b, 4c, 4d, 4e and 4f as shown in FIG. 2. In FIG. 2, the seat 4a is a driver's seat and the seat 4b is an assistant driver's seat.

The seats 4c, 4d are rear seats on a second row, and the seats 4e, 4f are rear seats on a third row. The seats 4c, 4e are located on a right side of the vehicle, while the seats 4d, 4f are located on a left side of the vehicle. The vehicle as shown in FIG. 2 is a so-called one box car having four rear seats 4c, 4d, 4e and 4f.

The display apparatus 1 according to the embodiment of the present invention includes a rotary portion 5 rotatably provided on the ceiling wall 3, an arm portion 6 supported by the rotary portion 5, a display unit 7 as a display portion supported by the arm portion 6, and a receiving part 8.

The rotary portion 5 includes a shaft member (not shown) which is fitted to the ceiling wall 3, a base part 5a rotatably provided with respect to the shaft portion and a friction member (not shown) which imparts friction torque to a rotary motion of the base part 5a with respect to the shaft member.

The above described base part 5a is formed in a substantially disc shape. In the illustrated example, the shaft member is arranged along an axis 5b which intersects the ceiling wall 3. In the illustrated example, the axis 5b intersects the ceiling wall 3 at substantially right angle, constituting a first rotation axis in the claims.

The rotary portion 5 is rotatable around the axis 5b over 360 degrees. The rotary portion 5 is attached to the ceiling wall 3 of the vehicle, with its base part 5a received in a central recess 20 which will be described later.

With the above described structure, the rotary portion 5 can be maintained at desired positions around the axis 5b by the friction torque of the aforesaid friction member. Moreover, an operator such as the passenger in the vehicle can change angular positions of the base part 5a, that is, the positions of the rotary portion 5 around the axis 5b, by manually rotating the base part 5a around the axis 5b to displace it to a desired angle.

The arm portion 6 is formed in a shape of a strip with its one end 6a rotatably supported on the rotary portion 5 by way of a first hinge unit 10. The first hinge unit 10 includes a base section fixed to either one of the rotary portion 5 and the arm portion 6, a shaft member which is rotatable with respect to this base section and adapted to be fixed to the other of the rotary portion 5 and the arm portion 6, and a friction member which applies friction torque to the rotary motion of the shaft member with respect to the base section.

The shaft member of the first hinge unit 10 is disposed along an axis 10a which extends along the ceiling wall 3. The axis 10a intersects the aforesaid axis 5b. In the illustrated embodiment, the axis 10a intersects the axis 5b at substantially right angle and constitutes a second rotation axis described in the claims. With the above described structure, the arm portion 6 is rotatably supported by the rotary portion 5 around the axis 10a.

The above described structure allows the first hinge unit to retain the arm portion 6 at the desired rotary positions around the axis 10a by the friction torque of the aforesaid friction member. Moreover, the operator such as the passenger in the vehicle can change angular positions of the arm portion 6 around the axis 10a, by manually rotating the arm portion 6 around the axis 10a to displace it to a desired angle.

The display unit 7 is rotatably supported by the other end 6b of the arm portion 6 by way of a second hinge unit 11.

The second hinge unit 11 includes a first hinge 12 and a second hinge 13.

The first hinge 12 includes a base section fixed to either one of the arm portion 6 and the second hinge 13, a shaft member which is rotatable with respect to this base section and fixed to the other of the arm portion 6 and the second hinge 13, and a friction member which applies friction torque to the rotary motion of the shaft member with respect to the base section.

The shaft member of the first hinge 12 is arranged along an axis 12a which extends along the ceiling wall 3. In the illustrated embodiment, the axis 12a is substantially in parallel to the axis 10a and intersects the axis 5b at substantially right angle. The axis 12a constitutes a fourth rotation axis described in the claims.

The second hinge 13 includes a base section fixed to either one of the first hinge 12 and the display unit 7, a shaft member which is rotatable with respect to this base section and fixed to the other of the first hinge 12 and the display unit 7, and a friction member which applies friction torque to the rotary motion of the shaft member with respect to the base section.

The shaft member of the second hinge 13 is arranged along an axis 13a which intersects the ceiling wall 3. In the illustrated embodiment, the axis 13a is substantially in parallel to the axis 5b and intersects the, axes 10a, 12a at substantially right angles. The axis 13a constitutes a third rotation axis described in the claims.

With the above described structure, the display unit 7 is rotatably supported by the arm portion 6 so as to rotate around the axes 12a, 13a which intersect each other.

The above described structure allows the second hinge unit 11 to retain the display unit 7 at the desired rotary positions around the axes 12a, 13a by the friction torque of the respective friction members of the aforesaid hinges 12, 13. Moreover, the operator such as the passenger in the vehicle can change angular positions of/the display unit 7 around the axes 12a, 13a by manually rotating the display unit 7 around the axes 12a, 13a to displace it to desired angles.

The display unit formed of a liquid crystal display panel or the like includes a display panel 15 which displays information such as images received by the television set, and a casing 16 for containing the display panel 15. The display unit 7 is formed in a rectangular shape in a plan view. The casing 16 is supported by the arm portion 6 by way of the second hinge unit 11.

As shown in FIGS. 3 to 7, the receiving part 8 includes the central recess 20 which defines a position for receiving the rotary portion 5, a plurality of grooves 21 constituting recesses described in the claims, and a display portion containing part 22 constituting a second recess described in the claims. The central recess 20, the grooves 21, and the display portion containing part 22 are respectively formed in the wall face 3a of the ceiling wall 3 in a concave manner.

The central recess 20 is provided in a substantially center of the ceiling wall 3. The central recess 20 has such a size that the base part 5a of the rotary portion 5 can be contained therein. The central recess 20 is in a shape of substantially a circle in a plan view.

The grooves 21 are formed so as to extend radially from the central recess 20 in directions different from one another. In the illustrated embodiment, the grooves 21 consists of a forward groove 21a which extends from the central recess 20 toward a front of the vehicle 2, a backward groove 21b which extends from the central recess 20 toward a rear of the vehicle 2, a forward right groove 21c which extends from the central recess 20 toward a front and right of the vehicle 2, and a forward left groove 21d which extends from the central recess 20 toward a front and left of the vehicle 2.

The forward right groove 21c extends from the central recess 20 toward an upper part of the seat 4c. The forward left groove 21d extends from the central recess 20 toward an upper part of the seat 4d. Each of the grooves 21a, 21b, 21c and 21d has an engaging section 23 which has a width rather smaller than the arm portion 6, and an operation section 24 which has a width sufficiently larger than the arm portion 6.

The grooves 21a, 21b, 21c and 21d support the arm portion 6 engaged in the engaging sections 23 respectively. Each of the grooves 21a, 21b, 21c and 21d has such a size that the arm portion 6 can be contained therein. From a state where the arm portion 6 is engaged in the engaging section 23, the operator can detach the arm portion 6 from the engaging section 23, by inserting his fingers through the operating section 24.

The display portion containing part 22 is provided in the forward groove 21a at its one end remote from the central recess 20. The display portion containing part 22 has such a size that it can contain the display unit 7 in a state where the display panel 15 is in parallel to the ceiling wall 3. The display portion containing part 22 is in a substantially rectangular shape in a plan view.

According to the above described structure, when the display apparatus 1 is not in use, the display unit 7 is kept contained in the display portion containing part 22 and the arm portion 6 is kept contained in the forward groove 21a. In this state, the display panel 15 of the display unit 7 faces with a floor of the passengers' room.

By maintaining this state, the display unit 7 will not project into the passengers' room while it is not in use. Because the display unit 7 is contained in the display portion containing part 22 provided in the ceiling wall 3 while it is not in use, a space for accommodating the display unit 7 can be saved.

In order to supply the information on the display unit 7 to all the passengers seated on the seats 4c, 4d, 4e and 4f, in other words , in order that all the passengers seated on the seats 4c, 4d, 4e and 4f can see the information on the display panel 15, the display unit 7 is rotated around the axis 12a of the first hinge 12 of the second hinge unit 11 from a state where the display panel 15 faces with a floor of the passengers' room to a state where the display panel 15 faces with all the passengers seated on the seats 4c, 4d, 4e and 4f.

By rotating the display unit 7 around the axis 12a to displace it into a state where the display panel faces with all the passengers seated on the seats 4c, 4d, 4e and 4f, all the passengers can visually observe the information displayed on the display panel 15.

Figure 5:
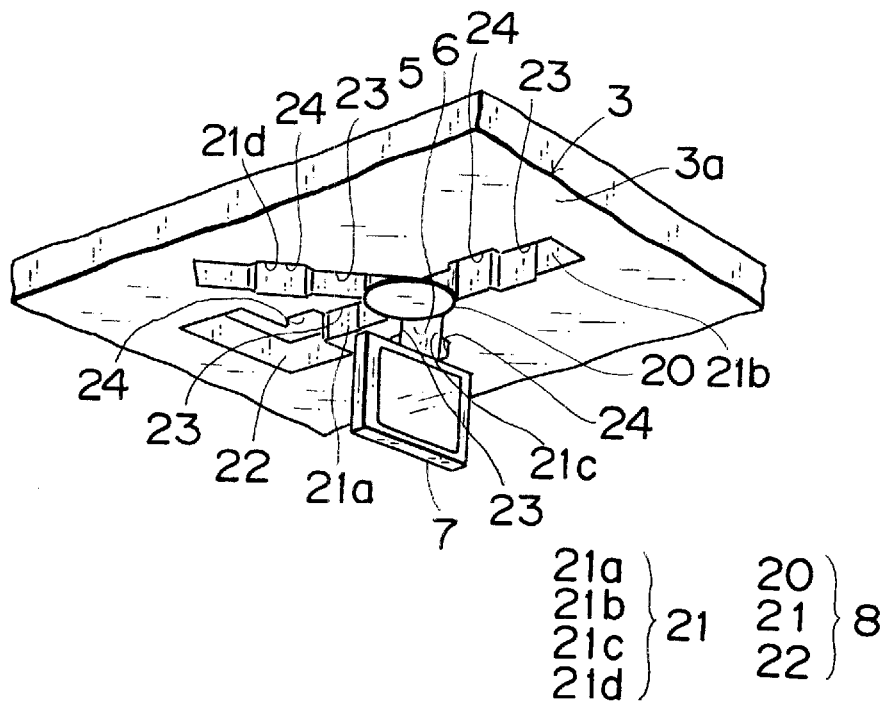
FIG. 5 is a perspective view showing the display apparatus according to the embodiment in a state where the information is supplied to a passenger seated on a right seat on a second row.

In order to supply the information on the display unit 7 to the passenger seated on the seat 4c, the arm portion 6 is detached from the forward groove 21a, and rotated together with the base part 5a around the axis 5b to be engaged in the forward right groove 21c as shown in FIG. 5.

Then, the display unit 7 is rotated around the axis 13a of the second hinge 13 of the second hinge unit 11 into a state where the display panel 15 faces with the passenger seated on the seat 4c.

Thus by rotating the display unit 7 around the axis 13a to displace it into the state where the display panel 15 faces with the passenger seated on the seat 4c, the passenger can be assured to visually observe the information displayed on the display panel 15.

Figure 6:
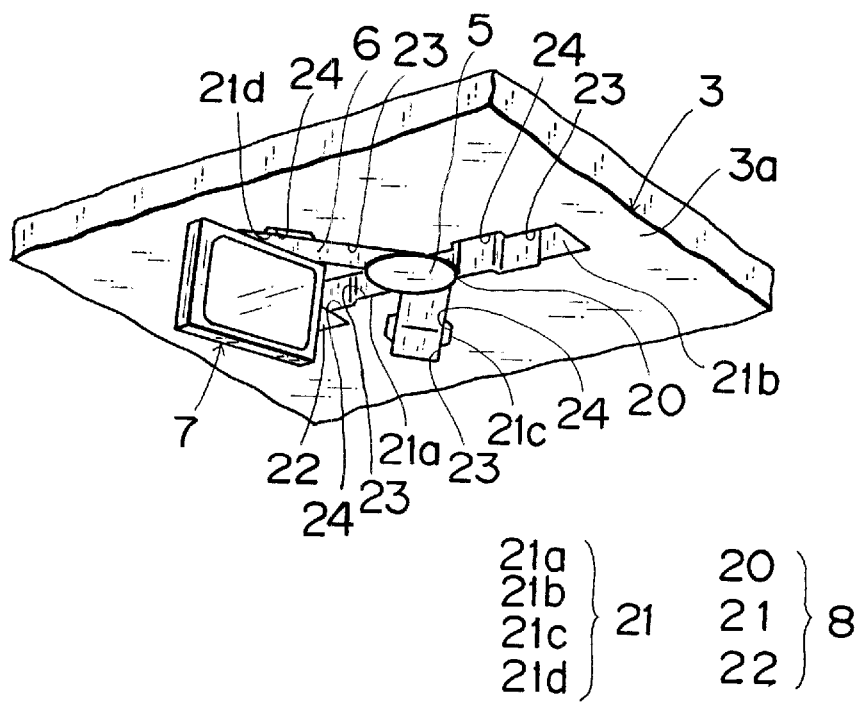
FIG. 6 is a perspective view showing the display apparatus according to the embodiment in a state where the information is supplied to a passenger seated on a left seat on the second row.

In order to supply the information on the display unit 7 to the passenger seated on the seat 4d, the arm portion 6 is rotated together with the base part 5a around the axis 5b in a desired direction to be engaged in the forward left groove 21d as shown in FIG. 6.

Then, the display unit 7 is rotated around the axis 13a of the second hinge 13 of the second hinge unit 11 into a state where the display panel 15 faces with the passenger seated on the seat 4d.

Thus, by rotating the display unit 7 around the axis 13a to displace it into the state where display panel 15 faces with the passenger seated on the seat 4d, the passenger can be assured to visually observe the information displayed on the display panel 15.

Figure 7:
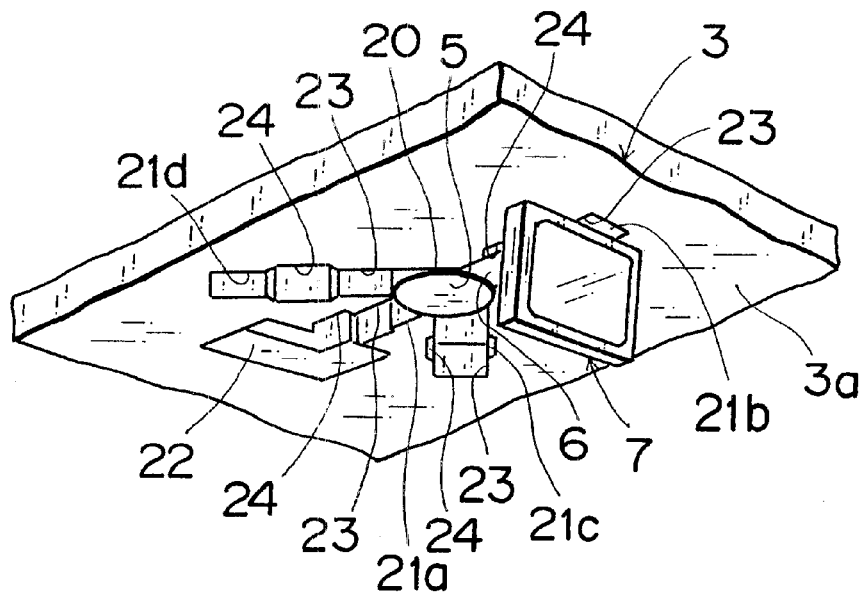
FIG. 7 is a perspective view showing the display apparatus according to the embodiment in a state where the information is supplied to passengers seated on seats on a third row.
Figure 8:
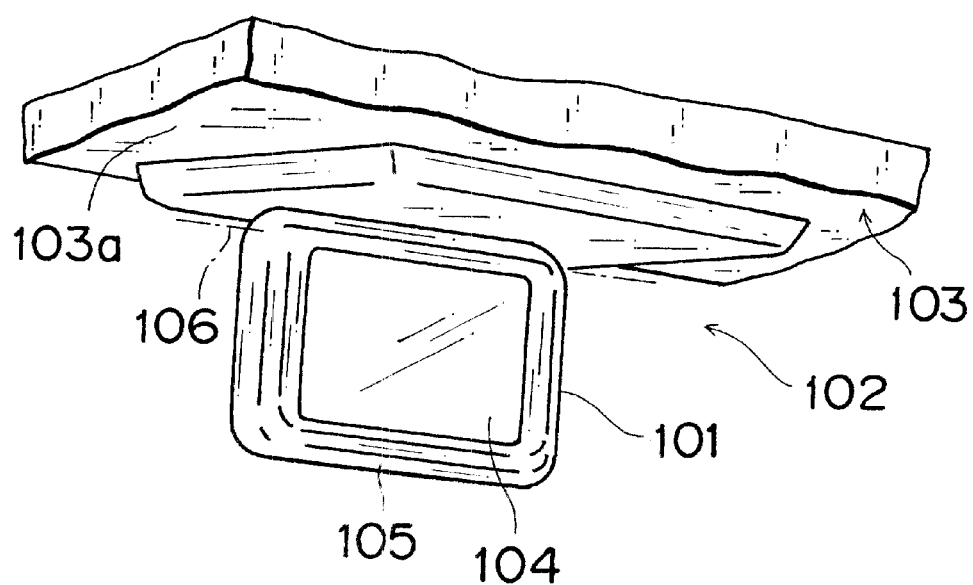
FIG. 8 is a perspective view showing a conventional display apparatus.

In order to supply the information on the display unit 7 to the passengers seated on the seats 4e, 4f, in other words in order that the passengers seated on the seats 4e, 4f can see the information on the display panel 15, the arm portion 6 is rotated together with the base part 5a around the axis 5b in a desired direction to be engaged in the backward groove 21b as shown in FIG. 7.

With the arm portion 6 contained in the backward groove 21b, the display unit 7 is rotated around the axes 12a, 13a of the hinges 12, 13 of the second hinge unit 11 into a state where the display panel 15 faces with the passengers seated on the seats 4e and 4f.

Thus, by rotating the display unit 7 around the axes 12a, 13a to displace it into the state where the display panel 15 faces with the passengers seated on the seats 4e and 4f, all the passengers seated on the seats 4e and 4f can be assured to visually observe the information displayed on the display panel 15.

As described before, the rotations of the arm portion 6, the display unit 7 and so on around the axes 5b, 10a, 12a, 13a are conducted by the operator by means of his hands or so, so that postures of the arm portion 6 and the display unit 7 can be changed. After the postures of the arm portion 6 and the display unit 7 have been changed, they can maintain the changed postures by the friction torque applied by the aforesaid friction members which are not shown.

According to the display apparatus in the present embodiment, the display unit 7 is supported on the rotary portion 5 by way of the arm portion 6, and the arm portion 6 is rotatable together with the base part 5a around the axis 5b. Accordingly, the display unit 7 moves extensively in the passengers' room in the moving body.

Moreover, the arm portion 6 is rotated together with the base part 5a around the axis 5b and also around the axes 10a, 12a, 13a, whereby the display unit 7 can be reliably faced with the passengers respectively seated on the seats 4c, 4d, 4e, 4f.

Therefore, differences in visibility of the information displayed on the display panel 15 of the display unit 7 according to the seats 4c, 4d, 4e, 4f can be eliminated, and the passengers seated on all the seats 4c, 4d, 4e, 4f are ensured to receive the information.

Because the arm portion 6 is provided so as to rotate around the axis 5b together with the base part 5a and supported on the rotary portion 5 so as to rotate around the axis 10a by means of the first hinge unit 10, and further, the display unit 7 is supported so as to rotate around the axes 12a, 13a of the second hinge unit 11 by means of the second hinge unit 11, the display unit 7 can be more reliably faced with the passengers respectively seated on the seats 4c, 4d, 4d, 4f.

Further, the axis 5b intersects the ceiling wall 3 at the substantially right angle, the axis 10a extends along the ceiling wall 3 and intersects the axis 5b at the substantially right angle, the axis 12a is arranged substantially in parallel to the axis 10a, and the axis 13a is arranged substantially in parallel to the axis 5b. Accordingly, the display unit 7 can be more reliably faced with the passengers respectively seated on the seats 4c, 4d, 4e, 4f.

In addition, while the display unit 7 is substantially faced with the passengers respectively seated on the seats 4c, 4d, 4d, 4f, the arm portion 6 is contained in either of the grooves 21a, 21b, 21c, 21d. Therefore, the space for mounting the display apparatus 1 can be saved.

Moreover, since the grooves 21a, 21b, 21c, 21d extend radially from the central recess 20, the display unit 7 can move in the passengers' room extensively and more reliably, in addition to the fact that either of the grooves 21a, 21b, 21c, 21d contains the arm portion 6 to save the mounting space. Thus, the display unit 7 can be more reliably faced with the seats 4c, 4d, 4d, 4f.

While the display apparatus 1 is not in use, the display unit 7 is contained in the display portion containing part 22. This enables the mounting space for the display apparatus to be further saved.

In the above described embodiment, the rotations of the arm portion 6 and the display unit 7 around the axes 5b, 10a, 12a, 13a are conducted by the operator by means of his hands or so. However, driving means such as a motor may be employed to rotate the arm portion 6 and the display unit 7 around the axes 5b, 10a, 12a, 13a.

Although the present invention has been fully described by way of examples referring to the accompanying drawings, it is to be noted that various changes and modifications will be apparent to those skilled in the art.

What is claimed is:

1. A display apparatus which comprises;
    a rotary portion rotatably provided on a ceiling of a moving body,
    an arm portion supported by said rotary portion,
    a display portion supported by said arm portion, and
    a plurality of recesses formed in a concave manner in a wall face of said ceiling of said moving body, said recesses being adapted to contain said arm portion.

2. The display apparatus as claimed in claim 1, wherein said display portion is provided on said arm portion so as to rotate around both a first rotation axis and a second rotation axis which intersect each other.

3. The display apparatus as claimed in claim 2, wherein said first rotation axis extends in a direction intersecting said ceiling.

4. The display apparatus as claimed in claim 1, wherein said recesses are different in directions from one another and formed so as to radially extend from a mounting position of said rotary portion with respect to said ceiling.

5. The display apparatus as claimed in claim 2, wherein said recesses are different in directions from one another and formed so as to radially extend from a mounting position of said rotary portion with respect to said ceiling.

6. The display apparatus as claimed in claim 3, wherein said recesses are different in directions from one another and formed so as to radially extend from a mounting position of said rotary portion with respect to said ceiling.

7. The display apparatus as claimed in claim 1, which comprises a second recess provided in at least one of a plurality of said recesses at a position remote from said mounting position of said rotary portion with respect to said ceiling, said second recess being adapted to contain said display portion.

8. The display apparatus as claimed in claim 2, which comprises a second recess provided in at least one of a plurality of said recesses at a position remote from said mounting position of said rotary portion with respect to said ceiling, said second recess being adapted to contain said display portion.

9. The display apparatus as claimed in claim 3 which comprises a second recess provided in at least one of a plurality of said recesses at a position remote from said mounting position of said rotary portion with respect to said ceiling, said second recess being adapted to contain said display portion.

10. The display apparatus as claimed in claim 4, which comprises a second recess provided in at least one of a plurality of said recesses at a position remote from said mounting position of said rotary portion with respect to said ceiling, said second recess being adapted to contain said display portion.

11. The display apparatus as claimed in claim 5, which comprises a second recess provided in at least one of a plurality of said recesses at a position remote from said mounting position of said rotary portion with respect to said ceiling, said second recess being adapted to contain said display portion.

12. The display apparatus as claimed in claim 6, which comprises a second recess provided in at least one of a plurality of said recesses at a position remote from said mounting position of said rotary portion with respect to said ceiling, said second recess being adapted to contain said display portion.

13. A display apparatus which comprises;
a rotary portion rotatably provided on a ceiling of a moving body,
an arm portion rotatably supported by said rotary portion,
a display portion rotatably supported by said arm portion, and
a plurality of recesses formed in a concave manner in a wall face of said ceiling of said moving body, said recesses being adapted to contain said arm portion.

14. The display apparatus as claimed in claim 13, wherein said display portion is provided on said arm portion so as to rotate around both a first rotation axis and a second rotation axis which intersect each other.

15. The display apparatus as claimed in claim 14, wherein said first rotation axis extends in a direction intersecting said ceiling.

16. The display apparatus as claimed in claim 13, wherein said recesses are different in directions from one another and formed so as to radially extend from a mounting position of said rotary portion with respect to said ceiling.

17. The display apparatus as claimed in claim 14, wherein said recesses are different in directions from one another and formed so as to radially extend from a mounting position of said rotary portion with respect to said ceiling.

18. The display apparatus as claimed in claim 15, wherein said recesses are different in directions from one another and formed so as to radially extend from a mounting position of said rotary portion with respect to said ceiling.

19. The display apparatus as claimed in claim 13, which comprises a second recess provided in at least one of a plurality of said recesses at a position remote from said mounting position of said rotary portion with respect to said ceiling, said second recess being adapted to contain said display portion.

20. The display apparatus as claimed in claim 14, which comprises a second recess provided in at least one of a plurality of said recesses at a position remote from said mounting position of said rotary portion with respect to said ceiling, said second recess being adapted to contain said display portion.

21. The display apparatus as claimed in claim 15, which comprises a second recess provided in at least one of a plurality of said recesses at a position remote from said mounting position of said rotary portion with respect to said ceiling, said second recess being adapted to contain said display portion.

22. The display apparatus as claimed in claim 16, which comprises a second recess provided in at least one of a plurality of said recesses at a position remote from said mounting position of said rotary portion with respect to said ceiling, said second recess being adapted to contain said display portion.

23. The display apparatus as claimed in claim 17, which comprises a second recess provided in at least one of a plurality of said recesses at a position remote from said mounting position of said rotary portion with respect to said ceiling, said second recess being adapted to contain said display portion.

24. The display apparatus as claimed in claim 18, which comprises a second recess provided in at least one of a plurality of said recesses at a position remote from said mounting position of said rotary portion with respect to said ceiling, said second recess being adapted to contain said display portion.

25. A display apparatus which comprises;
a rotary portion rotatably provided on a ceiling of a moving body so as to rotate around a first rotation axis which extends in a direction intersecting said ceiling,
an arm portion rotatably supported by said rotary portion so as to rotate around a second rotation axis which intersects a plane parallel to said first rotation axis,
a display portion rotatably supported by said arm portion, and
a plurality of recesses formed in a concave manner in a wall face of said ceiling of said moving body, said recesses being adapted to contain said arm portion.

26. The display apparatus as claimed in claim 25, wherein said display portion is provided on said arm portion so as to rotate around both a third rotation axis and a fourth rotation axis which intersect each other.

27. The display apparatus as claimed in claim 26, wherein
said third rotation axis is arranged in parallel to said first rotation axis, and
said fourth rotation axis is arranged in parallel to said second rotation axis.

28. The display apparatus as claimed in claims 25, wherein said recesses are different in directions from one another and formed so as to radially extend from a mounting position of said rotary portion with respect to said ceiling.

29. The display apparatus as claimed in claim 26, wherein said recesses are different in directions from one another and formed so as to radially extend from a mounting position of said rotary portion with respect to said ceiling.

30. The display apparatus as claimed in claim 27, wherein said recesses are different in directions from one another and formed so as to radially extend from a mounting position of said rotary portion with respect to said ceiling.

31. The display apparatus as claimed in claim 25, which comprises a second recess provided in at least one of a plurality of said recesses at a position remote from said mounting position of said rotary portion with respect to said ceiling, said second recess being adapted to contain said display portion.

32. The display apparatus as claimed in claim 26, which comprises a second recess provided in at least one of a plurality of said recesses at a position remote from said mounting position of said rotary portion with respect to said ceiling, said second recess being adapted to contain said display portion.

33. The display apparatus as claimed in claim 27, which comprises a second recess provided in at least one of a plurality of said recesses at a position remote from said mounting position of said rotary portion with respect to said ceiling, said second recess being adapted to contain said display portion.

34. The display apparatus as claimed in claim 28, which comprises a second recess provided in at least one of a plurality of said recesses at a position remote from said mounting position of said rotary portion with respect to said ceiling, said second recess being adapted to contain said display portion.

35. The display apparatus as claimed in claim 29, which comprises a second recess provided in at least one of a plurality of said recesses at a position remote from said mounting position of said rotary portion with respect to said ceiling, said second recess being adapted to contain said display portion.

36. The display apparatus as claimed in claim 30, which comprises a second recess provided in at least one of a plurality of said recesses at a position remote from said mounting position of said rotary portion with respect to said ceiling, said second recess being adapted to contain said display portion.

37. A display apparatus which comprises;

a rotary portion rotatably provided on a ceiling of a moving body so as to rotate around a first rotation axis which extends in a direction intersecting said ceiling, an arm portion rotatably supported by said rotary portion so as to rotate around a second rotation axis which intersects a plane parallel to said first rotation axis, and a display portion rotatably supported by said arm portion so as to rotate around both a third rotation axis and a fourth rotation axis which intersect each other, wherein said third rotation axis is arranged in parallel to said first rotation axis, and said fourth rotation axis is arranged in parallel to said second rotation axis.

* * * * *